Feb. 28, 1961            A. L. GRISÉ            2,973,118
PROPORTIONING TYPE LIQUID DISPENSING APPARATUS
Filed Oct. 4, 1956            2 Sheets-Sheet 1
FIG_1
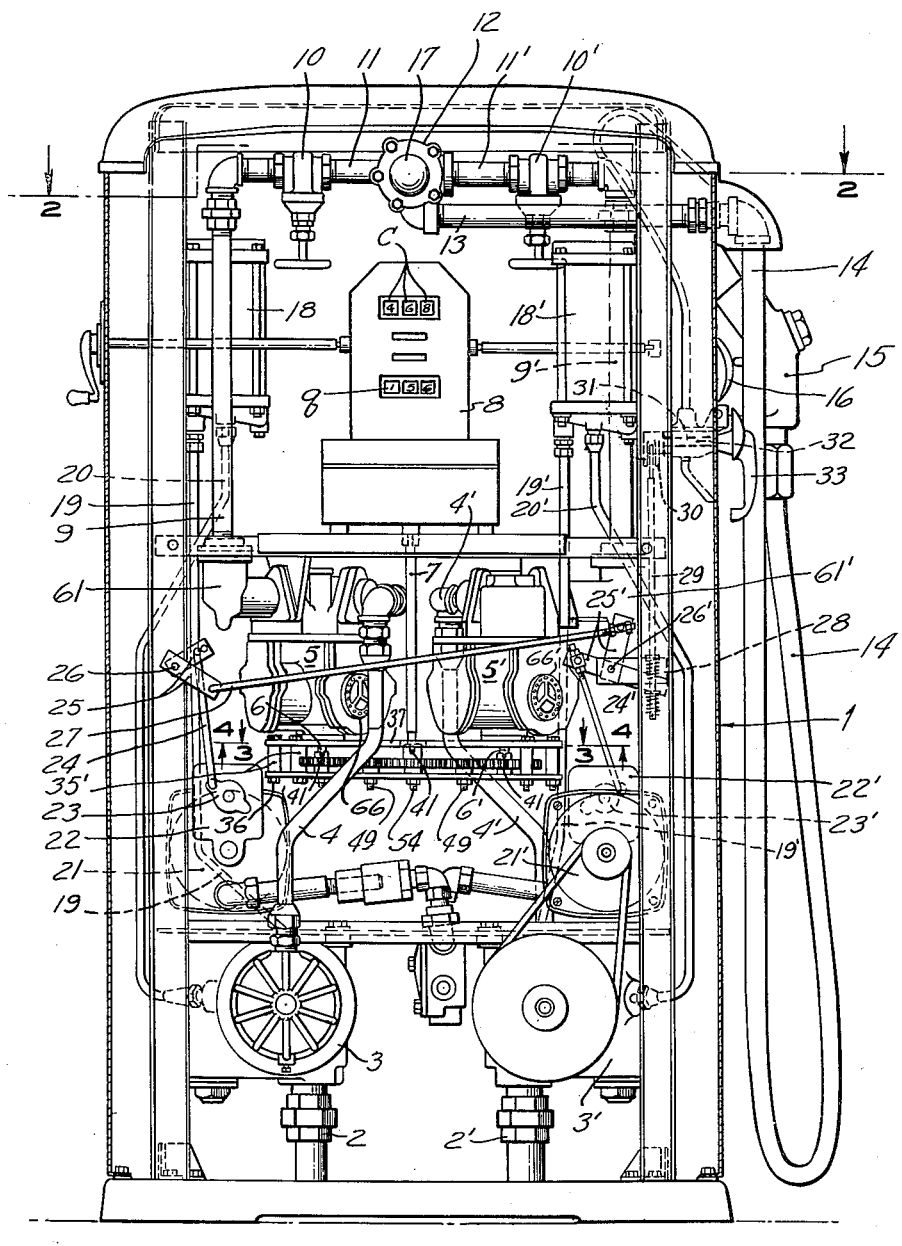
INVENTOR
ALFRED L. GRISÉ
BY Chapin & Neal
ATTORNEYS

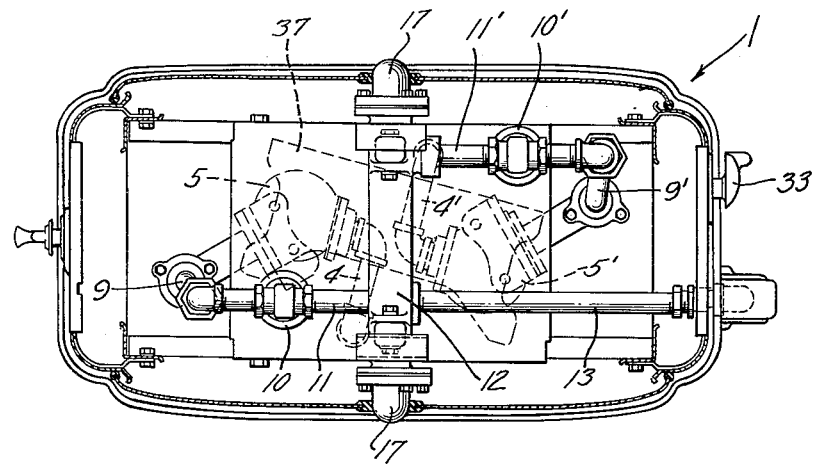
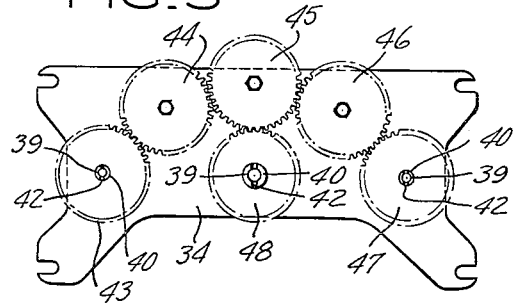
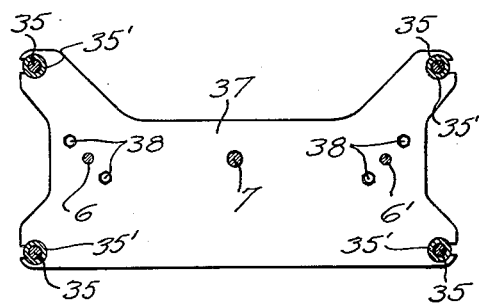
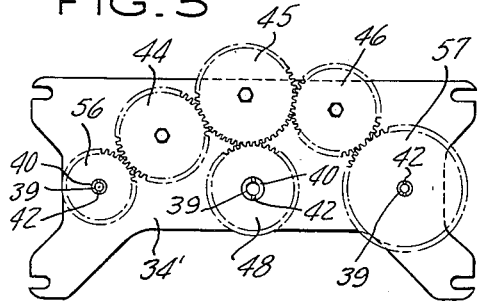
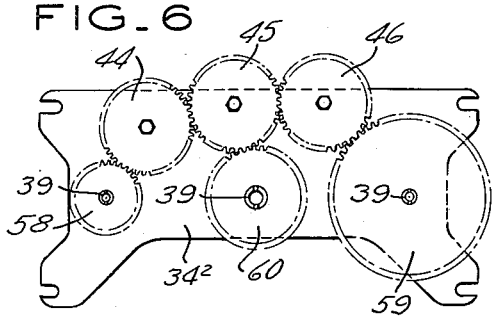
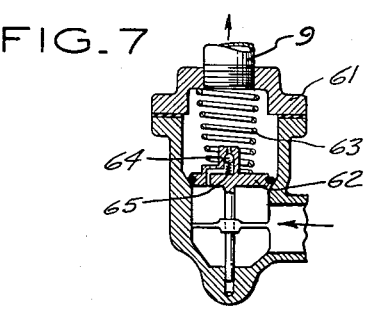
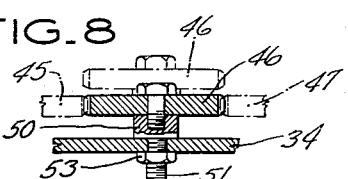

United States Patent Office 2,973,118
Patented Feb. 28, 1961

2,973,118

PROPORTIONING TYPE LIQUID DISPENSING APPARATUS

Alfred L. Grisé, Springfield, Mass., assignor to Gilbert & Barker Manufacturing Company, West Springfield, Mass., a corporation of Massachusetts Filed Oct. 4, 1956, Ser. No. 613,928

1 Claim. (Cl. 222—26)

This invention relates to an improved proportioning type dispensing apparatus for delivering a plurality of liquids in blends having various predetermined proportions of the constituent liquids.

While not limited thereto, the invention finds one advantageous use in dispensing different liquid motor fuels, which vary in octane rating, to provide blends having any of a number of different ratios of the constituent liquids.

The invention is of that general class in which a plurality of units, are provided one for each liquid to be dispensed, each unit having a meter and supply and discharge conduits therefor, the several meters being simultaneously supplied with liquid to drive them and their relative rates of movement being controlled by gearing, which interconnects the driven shafts of all the meters, a single register being provided to show the sum of the liquids dispensed by the meters.

This invention has for an object the provision of a simplified and improved blending type dispensing apparatus of the general class described.

One object of the invention is to provide in an apparatus of the class described, a simple spur gear train for interconnecting the meter shafts and also driving the register shaft, such train being mounted on a supporting plate which is adapted for convenient removal and replacement, so that one plate with the necessary gears to provide one blend ratio may be removed and replaced by another plate having the necessary gears to provide another blend ratio.

Another object of the invention is to provide in an apparatus of the class described, a gear train supporting plate, which is reversible so that the gear formerly connected to one meter shaft may be connected to the other meter shaft and vice versa.

Another object of the invention is to provide means for interrupting the transmission from any meter shaft to the register shaft, whereby all but one meter may be rendered ineffective to actuate the register and such one meter may be separately operated for calibration purposes.

A further object of the invention is to provide in one conduit of each meter a stop valve, whereby the flow to all but one of the meters may be cut off during calibration of that one meter.

The invention will be disclosed with reference to the one illustrative embodiment of it in the accompanying drawings, in which, Fig. 1 is a front elevational view of a blending dispensing apparatus embodying the invention, shown with the front panel removed;

Fig. 2 is a sectional plan on line 2—2 of Fig. 1;

Fig. 3 is a sectional plan view taken on the line 3—3 of Fig. 1 and showing one of the gear plates;

Fig. 4 is a sectional view taken on the line 4—4 of Fig. 1;

Figs. 5 and 6 are views taken similarly to Fig. 3 but showing other gear plates with other gear ratios to produce other blends of liquids;

Fig. 7 is a sectional elevational view of the pressure-regulating valve; and

Fig. 8 is a sectional elevational view illustrating how one of the idler gears can be raised out of mesh with its mating gears.

Referring to these drawings, there is shown in Fig. 1 by way of illustrative example, one form of liquid measuring and dispensing apparatus embodying the invention. As there shown, the apparatus involves two similar dispensing units mounted within a common housing 1 and arranged to deliver different kinds or grades of liquid in predetermined proportions and mix the same prior to discharge from the hose nozzle.

Since both units are alike, a description of one unit will suffice and corresponding parts of the other unit will be designated by the same reference numerals with the addition of a prime.

Liquid is drawn up from an underground storage tank through a suction pipe, shown in part at 2, by means of a suitable pump 3 and forced upwardly through a pipe 4 to a meter 5 of the positive displacement type, which drives a shaft 6 adapted to drive a suitable register. As will be explained later both meters serve through their shafts 6 and 6' to drive through a shaft 7 a single register 8, which indicates the quantity and/or cost of the blended liquids dispensed. From the meter, liquid is forced through a pipe 9, a normally-open stop valve 10 and a pipe 11 into a casing 12, wherein the liquids become mixed. The mixed or blended liquids are discharged from casing 12 through a pipe 13, which extends outside the housing 1 and is connected to a flexible hose 14, having at its delivery end the usual nozzle 15 equipped with the usual self-closing valve (not shown) which can be opened by a hand lever 16. At opposite ends of the casing 12 and communicating with the interior thereof are suitable indicators 17 to visibly indicate the flow of the blended liquids during dispensing.

The pump 3 may, for example, be of the type shown in my prior Patent No. 2,642,148, granted June 16, 1953, to the assignee of the present invention, and includes a relief-valve-controlled by-pass as well as an air separator. However, the liquid-recovery chamber 18 of the separator is here shown elevated above the separator and connected thereto by a pipe 19 and the recovered liquid is returned by way of a pipe 20 to the inlet side of pump 3.

The pump 3 is driven by an electric motor 21, having a switch which is contained in a casing 22 and may be operated by a lever 23. This lever is connected by a link 24 to one arm of a bellcrank 25, fulcrumed at 26. The other arm of bellcranks 25 and 25' are interconnected by a link 27. Fixed to the fulcrum 26' is a lever 28, which is connected by a link 29 to a lever 30, fixed on the inner end of a shaft 31. The latter is rotatably mounted in a bracket 32, which is fixed to housing 1 and serves to support the hose nozzle 15 when not in use. On the outer end of shaft 31 is fixed a hand lever 33, which is shown in its "off" position and which may be turned to simultaneously close both switches and start both motors 21 and 21' and thus actuate both pumps 3 and 3'. With the valve of the hose nozzle closed, the by-pass valves in the pumps open. When the nozzle valve is opened, liquid is forced through the meters and hose, as above described.

The elements described are all suitably supported, as indicated, from the frame of the housing 1.

The meters are of the positive displacement type. For example, each meter may be of reciprocating-piston type, such as disclosed in the Warren H. De Lancey Patent No. 2,121,120, granted June 21, 1938, to the assignee of the present invention. In a meter of this type there is no substantial degree of slippage of liquid past the pistons. Consequently, if the pistons of one meter are held back relatively to the pistons of the other meter, the relative rate of flow through the two meters can be controlled. To accomplish this result the shafts 6 and 6' are interconnected by gearing so as to move relatively at any selected rates and effect any selected proportion of the two liquids. The register shaft 7 is also driven from such gearing to actuate the quantity, or gallons counter wheels $q$ of the register. The register is of the well-known Veeder-Root type, such as is shown in Patent No. 2,151,239, granted March 21, 1939. As shown in such patent, the upper and cost counter wheels $c$ of the register are actuated from the lower and quantity counter wheels $q$ by a change-speed transmission by means of which the movement of the cost wheels $c$ may be adjusted to show the costs of the different blends.

Referring now to Fig. 3, a set of spur gears is shown for producing a blend having a fifty-fifty ratio. These gears are mounted on a supporting plate 34, which is secured by bolts 35 and nuts 36 to a similar plate 37 (shown in detail in Fig. 4). Plate 37 is fixed by bolts 38 to the bottom faces of the meters 5 and 5'. The bolts 35 include central spacers 35' to space the two plates apart. The drive shafts 6 and 6' and the register shaft 7 extend downwardly through plate 37 into a socket 39 in the upper end of the hub 40 of an underlying gear. Each such shaft has a cross pin 41 engageable in a slot 42 in the hub of the underlying gear to positively drive such gear. The train of intermeshing gears which interconnect the shafts 6 and 6' are designated 43, 44, 45, 46 and 47. A sixth gear 48 is provided for connecting the gear 45 to the shaft 7. The gears 43, 45, 47 and 48 are rotatably mounted on studs 49 fixed to plate 34. The gears 44 and 46 are also mounted on studs fixed to plate 34 (Fig. 8) but these studs 50 are of special form and have a long threaded portion 51 and a knurled lower end 52. When the lock nut 53 of a stud 50 is loosened, the stud may be turned by the knurled portion 52, whereby the gear 44 or 46, as the case may be, may be elevated, as indicated by dotted lines, until it is out of mesh with the two adjacent gears. The gear 48 is rotatably mounted on a stud 54 fixed to plate 34 in the same way as studs 49. In this Fig. 3 example, all the gears on plate 34 are of equal pitch diameter. Consequently, the shafts 6, 6' and 7 will move at equal speed. Thus, the meters 5 and 5' will deliver the two liquids at equal rates providing a blend having a 50–50 ratio. If one revolution of shaft 6 or 6' delivers one pint, one revolution of gear 48 will actuate the register wheels $q$ through shaft 7 to show the delivery of two pints of the mixture. As above noted, the price selector mechanism of the meter will be adjusted so that the cost counter wheels $c$ will be turned the proper amount to show the cost of the mixture dispensed.

In Fig. 5, another gear plate 34' has been shown which is interchangeable with the plate 34, above described, but which bears a different train of gears to provide a blend having a 60–40 ratio. The intermeshing idler gears 44, 45 and 46 are retained as well as the gear 48 which meshes with gear 45 and drives register shaft 7. All these gears have the same pitch diameter and in this example 60 teeth. The shaft 6, however, drives a smaller 50-tooth gear 56 which meshes with gear 44 and the shaft 6' drives a larger 75-tooth gear 57 which meshes with gear 46. Assuming that one revolution of shaft 6 causes the delivery of one pint, the gear 57 will turn two-thirds of a revolution and cause the delivery of two thirds of a pint. The total delivery is 1⅔ pints and shaft 7 will turn five-sixths of a revolution to cause the quantity counter wheels $q$ of the register to show a quantity of five-sixths of two or 1⅔ pints. As before, the price selector mechanism will be adjusted so that the counter wheels $c$ will show the cost of the mixture dispensed.

The shafts 6' are spaced equidistantly from shaft 7 and the axes of all these shafts lie in the same vertical plane. Also, the fastening devices 35 are symmetrically located with reference to such plane and the shafts 6 and 6'. Hence the plate 34' is reversible. Shaft 6 may be engaged with gear 57 and shaft 6' with gear 56 to provide a blend having a 40–60 ratio. This, of course, will necessitate another adjustment of the price selector mechanism to make the cost counter wheels $c$ show the cost of this blend.

In Fig. 6, a gear plate $34^2$ has been shown which is interchangeable with either of the other gear plates and which carries a train of spur gears for producing blend having a 70–30 ratio. The idler gears 44, 45 and 46 are retained, as before, and each has the same pitch diameter and 60 teeth. Shaft 6, however, drives a gear 58 having 45 teeth and shaft 6' drives a gear 59 having 105 teeth. A gear 60, having 63 teeth, meshes with the central idler gear 45. Assuming as before, that shaft 6 and gear 58 make one revolution and deliver one pint, gear 59 and shaft 6' will make 3/7 of a revolution and deliver 3/7 of a pint. The total 1 3/7 pints will be shown on the quantity counter wheels $q$ of the register since gear 60 and shaft 7 will be turned 5/7 of a revolution and 5/7 of two is 1 3/7. Also the price selector means of the register will be adjusted to make the cost counter wheels $c$ show the cost of the blend dispensed.

This plate $34^2$ is also reversible so that shaft 6 may drive gear 59 and shaft 6' may drive gear 58, whereby a blend having a 30–70 ratio may be had. Adjustment of the price selector mechanism will again be necessary.

It is usual, and especially desirable in this case, to interpose in pipes 9 and 9' a pressure-regulating valve which will open only after the liquid reaches a predetermined pressure. Also, provision is made in this valve for an expansion relief valve to enable backflow to relieve undue pressure in the hose, when necessary. The casings of these valves are shown at 61 and 61'. The casing 61 contains a valve 62 which is urged toward its seat by a spring 63. When the liquid pressure exceeds that of spring 63, valve 62 will open and allow outflow of liquid. When the liquid pressure is less, the spring 63 will close valve 62. Should backflow be necessary to relieve undue pressure due to expansion of the liquid, there is a passage through valve 62 which is normally closed by a small valve 64, having a closing spring 65. This valve 64 will not open under any pressure produced by the pumping means described. Besides their usual functions, these valves 62 and 62' serve to prevent delivery of unblended liquid. For example, if the supply of one liquid is depleted, the pumping of the other liquid will apply pressure on the valve 62 in the discharge pipe for the first liquid to close such valve and prevent movement of the pistons of the meter for the first liquid and through the gearing described and prevent operation of the meter for the other liquid.

The stop valves 10 and 10' and the elevatable idler gears 44 and 46 permit calibration of the meters. If it is desired to calibrate one meter, as for example 5, the stop valve 10' is closed and the gear 46 is raised until it is out of mesh with the gears 45 and 47, whereupon the meter 5 may be operated while meter 5' is at rest. Calibration is effected by the usual means, disclosed in the above-named De Lancey patent and exemplified in part herein by the hand wheels 66 and 66'. When calibration is completed, the stop valve 10' is opened and gear 46 is lowered until it meshes with the gears 45 and 47, whereupon it is fixed in vertical position by turning up the lock nut 52. In like manner, the meter 5' may be calibrated, after stop valve 10 is closed and gear 44 has been elevated until it is out of mesh with gears 43 and 45.

The invention thus provides a simplified and improved blending type liquid measuring and dispensing apparatus for the dispensing of blends of various ratios by its interchangeable sets of gears, for stopping the apparatus on failure of the supply of any one liquid and for the operation of the meters one at a time when calibration is required.

What is claimed is:

In a blending type liquid measuring and dispensing apparatus, having two meters with parallel driven shafts and supply and discharge conduits therefor, means for simultaneously forcing liquids to said meters to operate the latter and said shafts, a register having a driving shaft parallel with and in the same plane as the meter shafts and equidistant therefrom, a fixed plate in which the meter shafts and register shaft are journaled, a detachable plate having mounting means for support from said fixed plate for convenient attachment and detachment, said mounting means being symmetrically located with reference to the aforesaid plane and said meter shafts, a train of gears rotatably carried on said detachable plate, said train including a gate connected to each meter shaft a gear connected to the register driving shaft and idler gears intermediate the register shaft gear and each meter shaft gear, said detachable plate being detachable and reversible to reverse the gears to which the meter shafts are connected and change the blend ratio.

References Cited in the file of this patent
UNITED STATES PATENTS

| | | |
|---|---|---|
| 1,985,918 | De Lancey | Jan. 1, 1935 |
| 2,436,746 | Drought | Feb. 24, 1948 |
| 2,743,843 | Bliss | May 1, 1956 |

UNITED STATES PATENT OFFICE
CERTIFICATION OF CORRECTION

Patent No. 2,973,118 February 28, 1961

Alfred L. Grisé

It is hereby certified that error appears in the above numbered patent requiring correction and that the said Letters Patent should read as corrected below.

Column 6, line 4, for "gate" read -- gear --.

Signed and sealed this 1st day of August 1961.

(SEAL)
Attest:

ERNEST W. SWIDER
Attesting Officer

DAVID L. LADD
Commissioner of Patents